(12) United States Patent
Sakai (10) Patent No.: US 6,709,076 B2
(45) Date of Patent: Mar. 23, 2004

(54) ELASTIC CRAWLER AND METHOD OF PRODUCING THE SAME

(75) Inventor: Kenichi Sakai, Kishiwada (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 10/166,384

(22) Filed: Jun. 11, 2002

(65) Prior Publication Data

US 2002/0195876 A1 Dec. 26, 2002

(30) Foreign Application Priority Data

Jun. 26, 2001 (JP) ........................................ 2001-193420

(51) Int. Cl.$^7$ ............................................. B62D 55/24
(52) U.S. Cl. ........................ 305/165; 305/182; 264/229; 156/137; 156/196; 156/212
(58) Field of Search ................................. 156/137, 196, 156/212, 213; 264/229, 277, 279; 305/165, 166, 167, 182, 183, 60

(56) References Cited

U.S. PATENT DOCUMENTS 3,223,765 A * 12/1965 McNeil ...................... 264/229
4,268,471 A * 5/1981 Breher ...................... 264/229
4,407,550 A * 10/1983 Lapsys ...................... 305/166
5,219,505 A * 6/1993 Kaiser ...................... 264/138
5,427,443 A * 6/1995 Muramatsu et al. ........ 305/166

FOREIGN PATENT DOCUMENTS

JP         54-3737     * 1/1979
JP     07-223564 A    8/1995

* cited by examiner

Primary Examiner—Russell D. Stormer
(74) Attorney, Agent, or Firm—Nixon Peabody LLP; David S. Safran (57) ABSTRACT

An elastic crawler including a crawler body (6) made of a rubbery elastic material in a form of an endless belt, and a tension cord (10) being buried in the crawler body (6) along the circumferential direction A thereof and having opposite ends (10a), (10b) which are joined together by overlapping one upon the other so as to arrange the tension cord (10) as an endless cord having an overlapped joint portion (12). The overlapped joint portion (12) of the tension cord (10) is formed into an arcuate shape protruding on the outer circumferential side of the crawler.

10 Claims, 6 Drawing Sheets

ELASTIC CRAWLER AND METHOD OF PRODUCING THE SAME

BACKGROUND OF THE INVENTION

1. Field of the Invention

This invention relates to an elastic crawler employed for a crawler-type traveling apparatus used as a traveling unit for construction/civil engineering working machines and agricultural working machines, and to a method of producing the same.

2. Description of the Related Art

The crawler-type traveling apparatus is chiefly constituted by, for example, a drive wheel disposed on either the front side or the rear side in the direction of travel, an idler disposed on the other side, a plurality of rollers disposed between the drive wheel and the idler, and an elastic endless crawler wrapped around the drive wheel, idler and the plurality of rollers. By driving the drive wheel forward or reverse, the elastic crawler is circularly turned in the circumferential direction.

Figure 6:
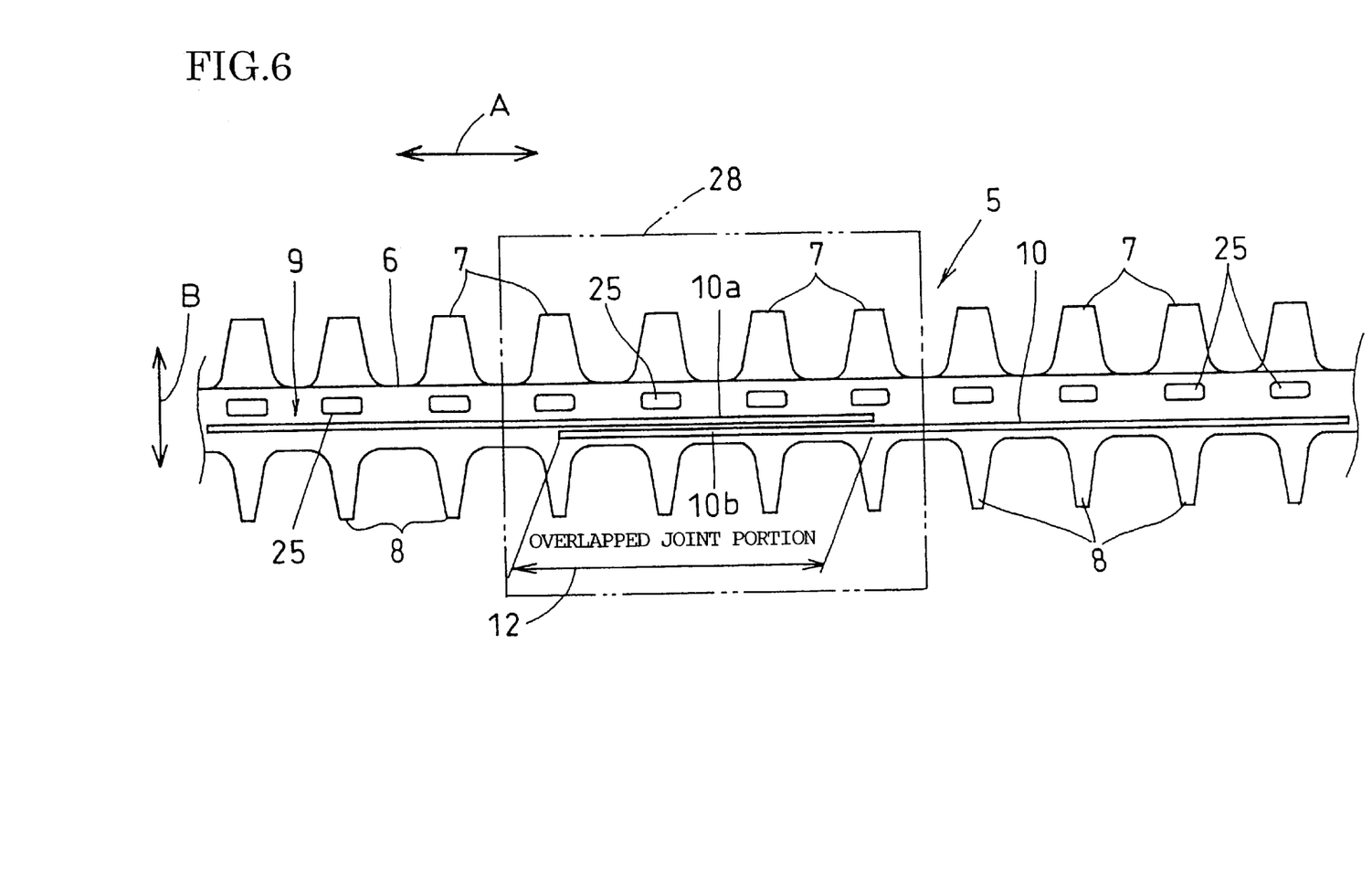
FIG. 6 is a side sectional view of the elastic crawler.

The elastic crawler employed for the crawler-type traveling apparatus includes, as shown in FIG. 6, a crawler body 6 in the form of an endless belt of a rubbery elastic material. Engaging protuberances 7 for preventing disengagement of wheels are provided on an inner circumferential side of the crawler body 6, and lugs 8 are integrally formed on an outer circumferential side of the crawler body 6.

Core metals 25 are buried in the crawler body 6 at suitable intervals in the circumferential direction A. Further, a tension member 9 is buried in the crawler body 6 for enabling the elastic crawler 5 to withstand the tension applied to the elastic crawler 5 in the circumferential direction A.

The tension member 9 may be the one in which tension cords 10 having opposite ends wound one turn along the circumferential direction A are arranged in parallel in the widthwise direction of the crawler at suitable intervals.

In the tension member 9 of this type, the tension cords 10 are longer than the whole length of the crawler body 6 in the circumferential direction A, and the ends 10a and 10b of each of the tension cords 10 are overlapped in the thicknesswise direction B of the crawler to join so that the tension cords 10 are formed into endless cords.

The elastic crawler 5 in which the opposite ends of the tension cords 10 are overlapped and joined together to form an endless shape can be produced by a method described below.

Figure 7:
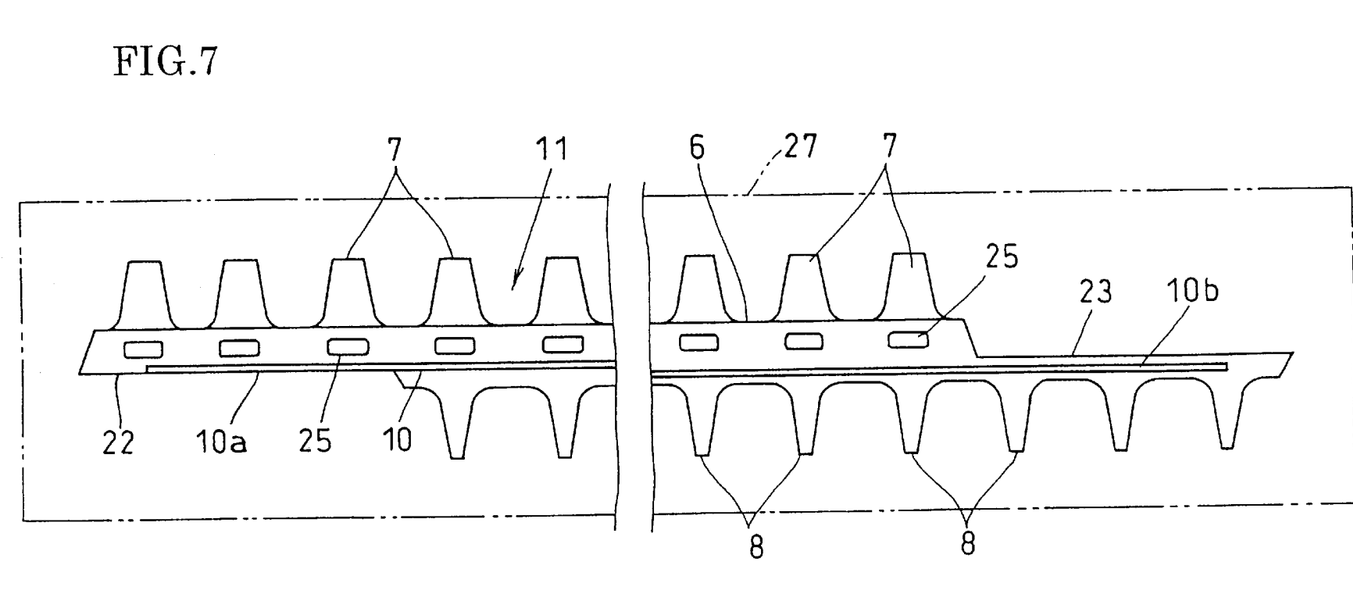
FIG. 7 is a side sectional view of a belt-like molded crawler body having opposite ends.

As shown in FIG. 7, first, a crawler body 11 in the form of a belt having opposite ends is formed by being primarily cured and molded in a flat plate-like mold 27.

Here, the crawler body 11 is formed with a flat surface 22 on the outer circumferential side on one end in the lengthwise direction thereof (corresponds to the circumferential direction A of the crawler), a flat surface 23 on the inner circumferential side on the other end thereof, and engaging protuberances 7 and lugs 8 formed on other portions.

Then, the flat surfaces 22 and 23 on the opposite ends of the crawler body 11 are overlapped one upon the other, and the overlapped portion is cured in a flat plate-like mold 28 having a linear cavity to thereby mold the endless elastic crawler 5 (refer to, for example, Japanese Unexamined Patent Publication No. HEI 7-223564).

According to the conventional method of production, therefore, the ends 10a and 10b of the tension cords 10 have the same length in the overlapped joint portion 12 of the tension cords 10.

In the above-mentioned conventional elastic crawler 5, a portion of the elastic crawler 5 corresponding to the overlapped joint portion 12 is molded by the flat plate-like mold 28, that is, overlapped portion of the molded crawler body 11 is cured and molded in a state where the overlapped joint portion 12 of the tension member 9 assumes the form of a straight line. As a result, when the portion of the elastic crawler 5 corresponding to the overlapped joint portion 12 is wrapped around the drive wheel, idler or rollers and deflected in a curved shape, a tensile stress acts on the ends 10b of the tension cords 10 in the overlapped joint portion 12 on the outer circumferential side of the crawler, and a compressive stress acts on the ends 10a of the tension cords 10 of the overlapped joint portion 12 on the inner circumferential side of the crawler.

The portion of the elastic crawler 5 corresponding to the overlapped joint portion 12 returns to the initial form of straight line when it moves away from the area where it is wrapped around the drive wheel or the like wheels.

This cycle of the curved state and linear state is repeated as the elastic crawler 5 is driven to be circularly turned in the circumferential direction A. When the elastic crawler 5 is used under severe conditions for extended periods of time, therefore, the adhering force between the tension cords 10 and the elastic material constituting the crawler body 6 is deteriorated in a short period of time between the ends 10a and 10b of the tension cords 10, often resulting in a peeling of the elastic material off the tension cords 10.

Further, the tension cords 10 may be broken at a boundary between the overlapped joint portion 12 and a portion where the tension member 9 is not overlapped.

In view of the above-mentioned problem, it is an object of the present invention to provide an elastic crawler having an extended life, which is not readily broken at a portion where the tension cords are overlapped due to fatigue by relieving the tensile stress acting on the outer circumferential side of the crawler and compressive stress acting on the inner circumferential side of the crawler in the overlapped portion when the elastic crawler is curved.

SUMMARY OF THE INVENTION

Technical means employed by the present invention for solving the above technical problem is an elastic crawler including a crawler body made of a rubbery elastic material in the form of an endless belt, a tension cord being buried in the crawler body along the circumferential direction thereof, the tension cord having opposite ends which are joined together by overlapping one upon the other so as to arrange the tension cord as an endless cord, wherein an overlapped joint portion of the tension cord is formed into an arcuate shape protruding on the outer circumferential side of the crawler.

A portion of the elastic crawler corresponding to the overlapped joint portion of the tension cord may be cured and molded in a mold so as to assume an arcuate shape protruding on the outer circumferential side of the crawler.

The radius of arc of the overlapped joint portion of the tension cord is preferably 1 to 2 times as large as the radius of a drive wheel round which the elastic crawler is wrapped.

Another technical means is a method of producing an elastic crawler including a crawler body made of a rubbery elastic material in a form of an endless belt, a tension cord being buried in the crawler body along the circumferential direction thereof, the tension cord having opposite ends which are joined together by overlapping one upon the other so as to arrange the tension cord as an endless cord. The method comprises steps of: molding a belt-like crawler body having opposite ends, overlapping the ends of the molded crawler body one upon the other, and curing and molding the overlapped portion to produce an endless elastic crawler. The overlapped portion of the molded crawler body is cured and molded in a mold so as to assume an arcuate shape protruding on the outer circumferential side of the crawler.

Another technical means of the present invention is a method of producing an elastic crawler including a crawler body made of a rubbery elastic material in a form of an endless belt, a tension cord being buried in the crawler body along the circumferential direction thereof, the tension cords having opposite ends which are joined together by overlapping one upon the other so as to arrange the tension cord as an endless cord. The method comprises steps of: molding a belt-like crawler body having opposite ends, overlapping the ends of the molded crawler body one upon the other, and curing and molding the overlapped portion to produce an endless elastic crawler. The overlapped portion is pre-molded in the overlapping process so as to assume an arcuate shape protruding on the outer circumferential side of the crawler.

A still another technical means of the present invention is a method of producing an elastic crawler including a crawler body made of a rubbery elastic material in a form of an endless belt, a tension cord being buried in the crawler body along the circumferential direction thereof, the tension cords having opposite ends which are joined together in an endless manner by overlapping one upon the other so as to arrange the tension cord as an endless cord. The method comprises steps of: molding a belt-like crawler body having opposite ends, overlapping the ends of the molded crawler body one upon the other, and curing and molding the overlapped portion to produce an endless elastic crawler. The overlapped portion is pre-molded in the overlapping process so as to assume an arcuate shape protruding on the outer circumferential side of the crawler and, then, the pre-molded overlapped portion is cured and molded in a mold so as to assume an arcuate shape protruding on the outer circumferential side of the crawler.

The radius of arc of the overlapped portion of the molded crawler body is preferably 1 to 2 times as large as a radius of a drive wheel around which the elastic crawler is wrapped.

DETAILED DESCRIPTION OF THE PREFERRED EMBODIMENTS

An embodiment of the invention will now be described with reference to the drawings.

Figure 2:
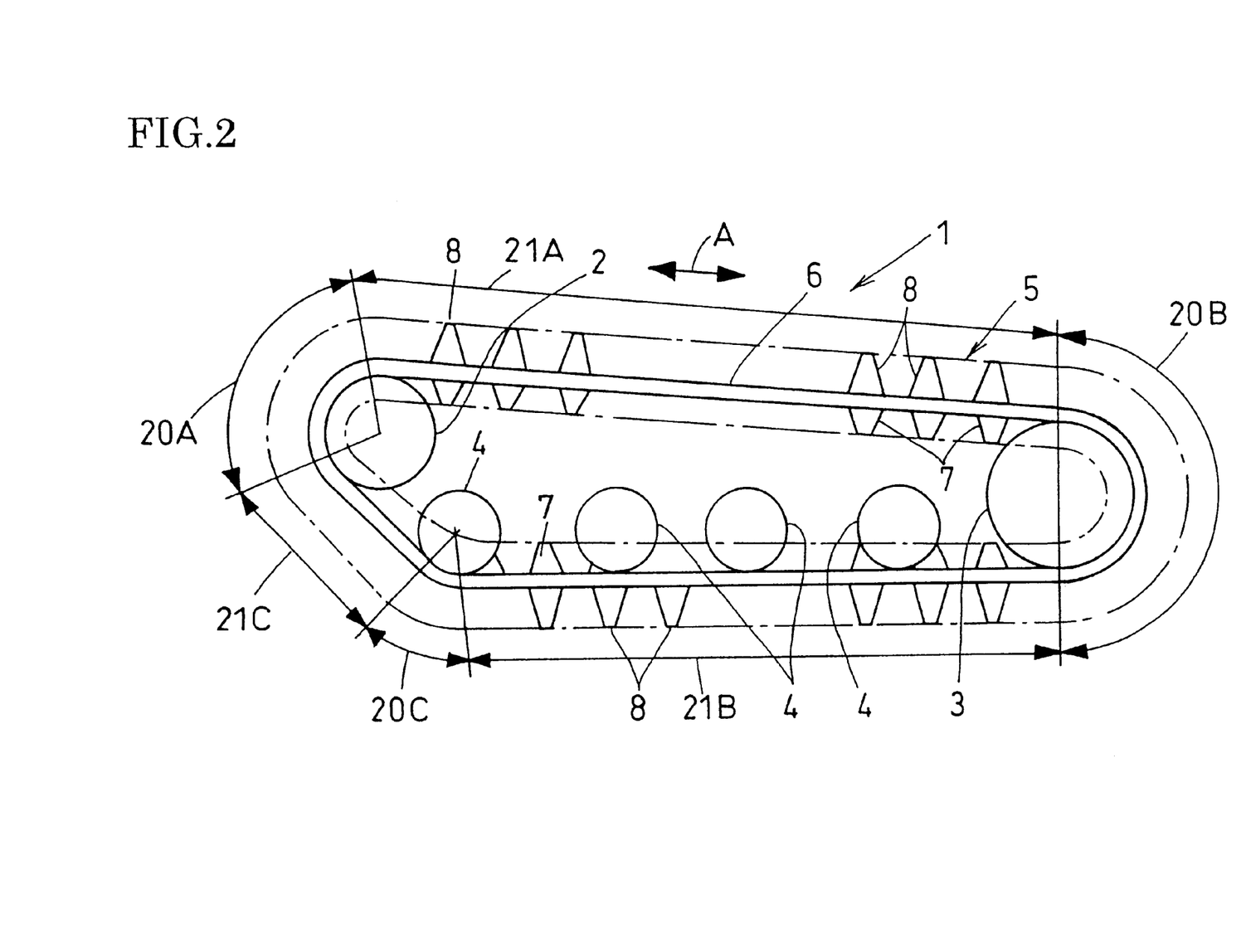
FIG. 2 is a side view of a crawler-type traveling apparatus.

In FIG. 2, reference numeral 1 denotes a crawler-type traveling apparatus which includes a drive wheel (or sprocket) 2 disposed on either the front side or the rear side in the direction of travel, a guide wheel (or idler) 3 disposed on the other side, a plurality of rollers 4 disposed between the drive wheel 2 and the guide wheel 3, and an elastic endless crawler (or rubber crawler) 5 wrapped around the drive wheel 2, the guide wheel 3 and the plurality of rollers 4. By driving the drive wheel 2 forward or reverse, the elastic crawler 5 is circularly turned in the circumferential direction A, so that the traveling apparatus 1 travels forward or reverse.

The elastic crawler 5 includes a crawler body 6 in a form of an endless belt of a rubbery elastic material (usually a rubber material). Engaging protuberances 7 for preventing disengagement of wheels are provided on the inner circumferential side of the crawler body 6, while lugs 8 are integrally formed on the outer circumferential side, which comes into contact with the ground, of the crawler body.

The elastic crawler 5 may be either one of a type having core metals in which the core metals 25 extending in the widthwise direction of the crawler are buried in the crawler body 6 at suitable intervals in the circumferential direction A, or a type without core metal in which the core metals 25 are not buried.

In the elastic crawler 5 of the type without core metal, the engaging protuberances 7 work to transmit the driving force from the drive wheel 2 to the elastic crawler 5.

A tension member 9 is buried in the crawler body 6 for enabling the elastic crawler 5 to withstand a tension applied to the elastic crawler 5 in the circumferential direction A.

The tension member 9 is so constituted that tension cords 10 each having opposite ends 10a and 10b are wound one turn along the circumferential direction A and buried in the crawler body 6 in parallel to each other in the widthwise direction of the crawler at suitable intervals.

Figure 1:
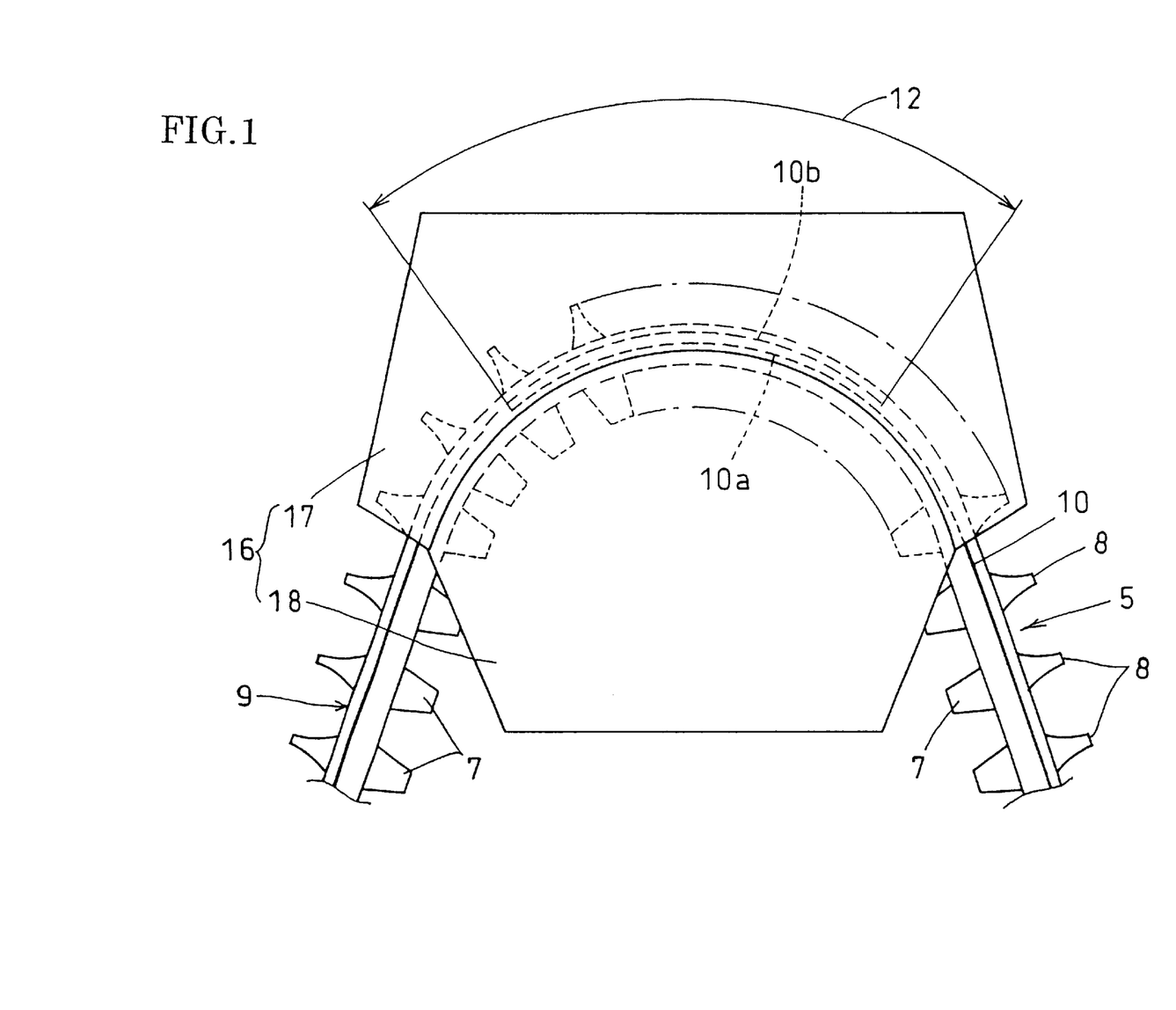
FIG. 1 is a side view illustrating a state where an elastic crawler is cured and molded into an arcuate shape in a mold.

The tension cords 10 are longer than the whole length of the crawler body 6 in the circumferential direction thereof, and the ends 10a and 10b of each of the tension cords 10 are overlapped in the thicknesswise direction of the crawler and joined so as to arrange the tension cords 10 as endless cords (see FIGS. 1 and 7).

The portion where the tension member 9 is overlapped is referred to as an overlapped joint portion 12 (see FIGS. 1 and 6).

As the tension cord 10, there is used a cord having a large tensile strength, such as a steel cord obtained by twisting several bundles each of which being formed by twisting several steel filaments, a nylon or Tetron cord constituted by filaments of nylon, Tetoron or the like, other organic fiber cord, an aramid fiber cord or a glass fiber cord.

To produce the elastic crawler 5 having aforementioned constitution, the belt-like molded crawler body 11 having opposite ends is molded, the ends of the molded crawler body 11 are overlapped thicknesswise in the direction of the crawler, and the overlapped portion is cured and molded to obtain an endless belt-like elastic crawler 5 in which the ends of the molded crawler body 11 are joined together.

In the present invention, the overlapped joint portion 12 of the tension cords 10 is formed into an arcuate shape protruding on the outer circumferential side of the crawler by curing and molding the overlapped portion of the molded crawler body 11 in a mold 16 to form into an arcuate shape protruding on the outer circumferential side of the crawler, or by pre-molding the overlapped portion in the overlapping process to form into an arcuate shape protruding on the outer circumferential side of the crawler.

In the elastic crawler comprising a tension member having opposite ends joined together in the overlapping process and buried in the crawler body as disclosed in Japanese unexamined Patent Publication No. HEI 7-223564, the overlapped joint portion of the tension cords is corrugated so as to reduce the rigidity of a portion of the elastic crawler corresponding to the overlapped joint portion. In this case, however, since the overlapped joint portion is corrugated, there exist portions protruding on the outer circumferential side as well as portions protruding on the inner circumferential side of the crawler. As a result, when the portion of the elastic crawler corresponding to the overlapped joint portion is curved, the inwardly protruding portion of the overlapped joint portion exhibits the action which is against the effect for relieving the stress of the present invention.

According to this invention, therefore, the overlapped joint portion 12 as a whole is formed in an arcuate shape that protrudes on the outer circumferential side of the crawler from one end toward the other end thereof in the circumferential direction A of the crawler.

A method of producing the elastic crawler 5 will now be concretely described.

According to a first production method of the present invention, the elastic crawler 5 is molded on its portions corresponding to portions of the tension cords 10 other than the overlapped joint portion 12 or other than the overlapped joint portion 12 and its vicinities to be formed into the belt-like crawler body 11 having opposite ends by a flat plate-like mold as in the conventional way.

Figure 5:
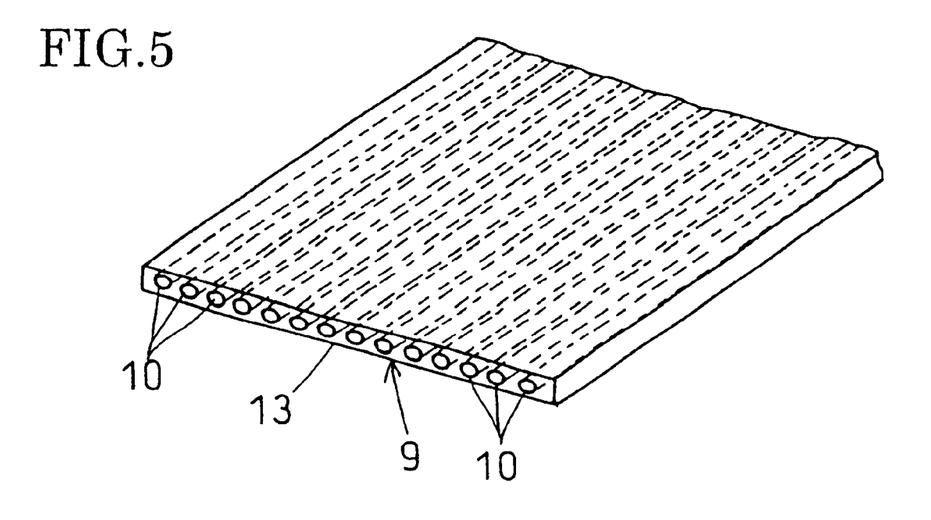
FIG. 5 is a perspective view of the tension member coated with rubber.

As shown in FIG. 5, the tension member 9 is coated with an uncured rubber 13 in advance and is molded into a belt-like plate by extrusion molding or the like. The crawler body 11 is molded by the flat plate-like mold (see FIG. 3) so that the opposite ends of the tension member 9 covered with the rubber extend from the opposite ends, respectively, in the lengthwise direction of the crawler body 6 of the belt-like crawler body 11 having opposite ends.

Figure 3:
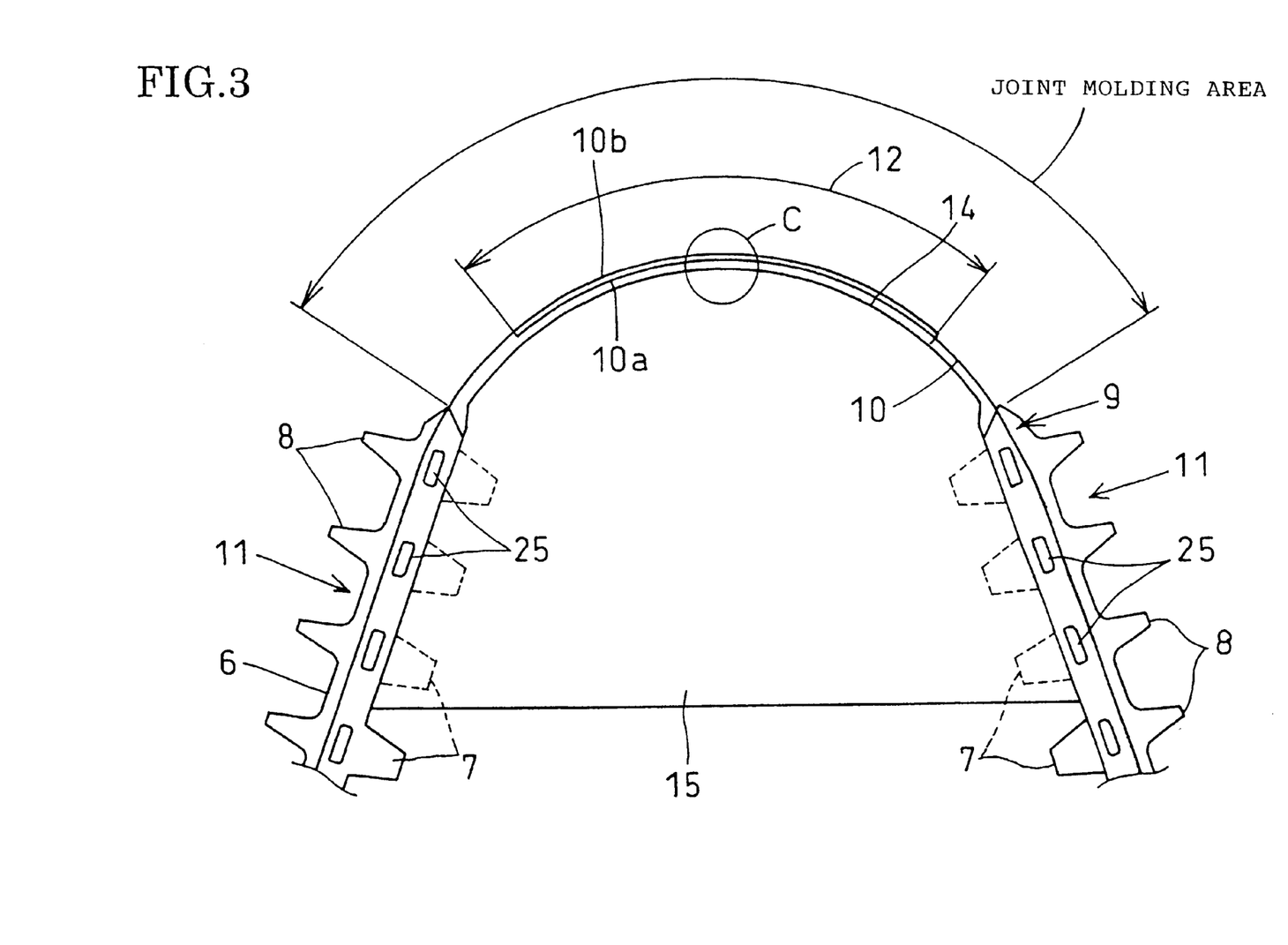
FIG. 3 is a side view illustrating a state where an overlapped joint portion of a tension member is pre-molded into an arcuate shape.
Figure 4:
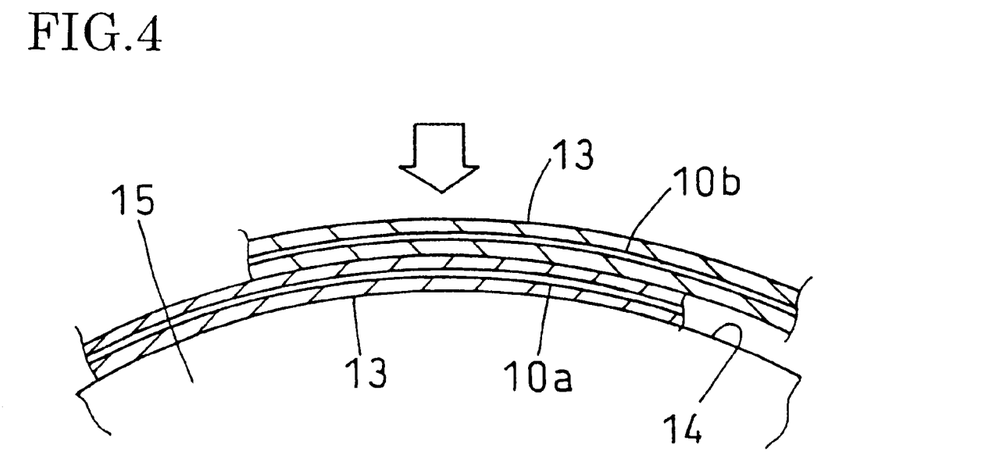
FIG. 4 is an enlarged sectional view illustrating a portion C of FIG. 3.

As shown in FIGS. 3 and 4, the opposite ends of the tension member 9 are overlapped on a molding plate 15 having an arcuate upper surface 14, i.e., on the arcuate surface 14, the overlapped portion (overlapped joint portion 12) is pressed from the upper side so that the ends of the tension member 9 coated with rubber are intimately joined to each other, and the overlapped joint portion 12 is pre-molded into an arcuate shape which protrudes on the outer circumferential side of the crawler.

The pre-molded overlapped joint portion 12 as well as the preceding and succeeding portions thereof in the circumferential direction A of the crawler are cured in the mold 16 having an arcuate cavity that protrudes on the outer circumferential side of the crawler as shown in FIG. 1, that is, the portion of the elastic crawler 5 corresponding to the overlapped joint portion 12 is molded into an arcuate shape that protrudes on the outer circumferential side of the crawler.

The mold 16 is constituted by a mold 17 on the grounding side for molding the outer circumferential side of the elastic crawler 5 and a mold 18 on the inner circumferential side for molding the inner circumferential side of the elastic crawler 5. Into the cavity between the molds 17 and 18, there are introduced the overlapped joint portion 12 pre-molded into an arcuate shape by the molding plate 15 as well as the preceding and succeeding portions thereof, uncured rubber for forming the inner circumferential side and the outer circumferential side of the elastic crawler 5, and the core metals 25 if they are to be buried therein, which are, then, cured to mold a portion of the elastic crawler 5 corresponding to the overlapped joint portion 12.

In the pre-molding process of the overlapped joint portion 12 into an arcuate shape, the uncured rubber for forming the inner and outer circumferences of the elastic crawler 5 and the core metals 25 may be pre-molded into the arcuate shape together with the overlapped joint portion 12.

In the elastic crawler 5 molded by this production method, the ends 10a of the tension cords 10 in the overlapped joint portion 12 of the tension member 9 on the inner circumferential side of the crawler (hereinafter also referred to as cord ends on the inner circumferential side) are formed to be shorter than the ends 10b of the tension cords 10 on the outer circumferential side of the crawler (hereinafter also referred to as cord ends on the outer circumferential side), that is, the cord ends 10b on the outer circumferential side of the overlapped joint portion 12 are formed to be longer than the cord ends 10a on the inner circumferential side.

As shown in FIG. 2, the elastic crawler 5 is curved at wrapped portions 20A, 20B and 20C where it is wrapped around the drive wheel 2, guide wheel 3 and rollers 4. Since the overlapped joint portion 12 is formed into an arcuate shape, and the cord ends 10a on the inner circumferential side of the overlapped joint portion 12 is shorter than the cord ends 10b on the outer circumferential side as described above, the tensile stress acting on the cord ends 10b on the outer circumferential side of the overlapped joint portion 12 and the compressive stress acting on the cord ends 10a on the inner circumferential side of the overlapped joint portion 12 can be relieved. As a result, the distortion between the inner circumference and the outer circumference of the crawler in the overlapped joint portion 12 can be relieved.

Referring to FIG. 2, the elastic crawler 5 becomes flat (linear) in the linear portions 21A, 21B and 21C other than the wrapped portions 20A, 20B and 20C. When the elastic crawler 5 is circularly turned, the curved state and the linear state are repeated. With the elastic crawler of the above constitution, however, the tensile stress and the compressive stress in the overlapped joint portion 12 at the wrapped portions 20A, 20B and 20C are relieved. Therefore, the elastic crawler is prevented from being destroyed due to fatigue in a short period of time.

In the present invention, since the portion of the elastic crawler 5 corresponding to the overlapped joint portion 12 is cured and molded into an arcuate shape, a tensile stress acts on this portion on the inner circumferential side of the crawler and a compressive stess acts on the outer circumferential side of the crawler when this portion is straightened. During the traveling, however, no problem occurs since the load acting on the elastic crawler 5 is great in the wrapped portions 20A, 20B and 20C but is small in the straight portions 21A, 21B and 21C.

The portion of the elastic crawler 5 corresponding to the overlapped joint portion 12 is preferably formed into an arcuate shape having a degree of arc lying nearly midway between the straight line and the arc of the wrapped portions 20A, 20B, 20C. More specifically, the radius of arc of the tension cords 10 in the overlapped joint portion 12 or the radius of arc of the overlapped portion of the molded crawler body 11 (for example, radius at the central portion in the thicknesswise direction of the crawler) is preferably from 1 to 2 times as great as the radius of the drive wheel 2 around which the elastic crawler 5 is wrapped.

When the radius of arc of the overlapped joint portion 12 is smaller than the radius of the drive wheel 2, the distortion becomes great between the inner circumference and the outer circumference of the crawler when the portion of the elastic crawler 5 corresponding to the overlapped joint portion 12 becomes straight. On the other hand, when the radius of arc of the overlapped joint portion 12 exceeds twice the radius $R_2$ of the drive wheel 2, the stress at the wrapped portions 20A, 20B and 20C cannot be sufficiently relieved.

In the above first production method, after the overlapped joint portion 12 of the tension member 9 is formed into an arcuate shape on the molding plate 15, the portion of the elastic crawler 5 corresponding to the overlapped joint portion 12 may be cured and molded by a flat plate-like mold as in the prior art (see FIG. 6).

Since the overlapped joint portion 12 of the tension member 9 is pre-molded into an arcuate shape on the molding plate 15, the ends of the tension member 9 are intimately joined together. Therefore, even when the overlapped joint portion 12 is cured using the flat plate-like mold, the stress at the wrapped portions 20A, 20B and 20C is relieved as compared to that of the prior art since the cord ends 10b on the outer circumferential side of the overlapped joint portion 12 are cured maintaining a slack with respect to the cord ends 10a on the inner circumferential side, though the effect for relieving the stress is not as great as that of the above-mentioned one that is cured and molded in an arcuate shape.

Now, a second production method of the present invention is described.

According to the second method of producing the elastic crawler 5, the belt-like crawler body 11 having opposite ends is molded, first, by being primarily cured in the flat plate-like mold.

In this case, as shown in FIG. 7, the belt-like molded crawler body 11 is formed with a flat surface 22 on the outer circumferential side on one end in the lengthwise direction thereof, a flat surface 23 without engaging protuberance 7 on the inner circumferential side on the other end, and engaging protuberances 7 and lugs 8 in other portions thereof as in the prior art.

The flat surfaces 22 and 23 on the opposite ends of the belt-like molded crawler body 11 are overlapped one upon the other, and the overlapped portion is cured and molded in the mold 16 having an arcuate cavity as shown in FIG. 1.

In this case, though the crawler body primarily cured in the form of a belt having opposite ends is formed into an arcuate shape during the cure in the mold 16, a "deviation" occurs in the circumferential direction A, that is, a difference occurs in the circumferential length, between the cord ends 10b on the outer circumferential side and the cord ends 10a on the inner circumferential side of the tension cords 10 in the overlapped joint portion 12, providing the same effect as that of the first production method.

The molded crawler body 11 employed in the first production method may be directly molded by the mold 16 having an arcuate cavity without pre-molding into an arcuate shape by the molding plate 15.

The elastic crawler 5 according to the present invention may employ any constitution for the portions other than the overlapped joint portion of the tension member 9 buried in the crawler body 6.

According to this invention described in detail by way of the embodiment, the overlapped joint portion of the tension cords buried in the elastic crawler is formed into an arcuate shape protruding on the outer circumferential side of the crawler. Therefore, the present invention can relieve both of the tensile stress which acts on the ends of the tension cords on the outer circumferential side of the crawler in the overlapped joint portion and the compressive stress which acts on the ends of the tension cords on the inner circumferential side of the crawler when the portion of the elastic crawler corresponding to the overlapped joint portion of the tension cords is wrapped around the drive wheel or the like wheel and is curved, thereby preventing the elastic crawler from being destroyed in a short period of time due to fatigue.

Further, since the portion of the elastic crawler corresponding to the overlapped joint portion of the tension cords produces a decreased resistance when it is wrapped around the drive wheel or the like wheel, the traveling resistance decreases and the loss of horsepower is prevented.

Further, according to the method of producing the elastic crawler in the form of an endless belt of the present invention which comprises steps of molding a belt-like crawler body having opposite ends; overlapping the ends of the molded crawler body one upon the other; and curing and molding the overlapped portion, the overlapped portion of the molded crawler body is cured and molded in a mold so as to assume an arcuate shape protruding on the outer circumferential side of the crawler, pre-molded in the overlapping process so as to assume an arcuate shape protruding on the outer circumferential side of the crawler, or pre-molded in the overlapping process so as to assume an arcuate shape protruding on the outer circumferential side of the crawler and cured and molded in a mold so as to assume an arcuate shape protruding on the outer circumferential side of the crawler. As a result, the overlapped joint portion of the tension cords can be formed into an arcuate shape protruding on the outer circumferential side of the crawler, thereby providing the above mentioned effect of relieving the stress.

Further, since the radius of arc of the overlapped joint portion of the tension cords or the overlapped portion of the molded crawler body is from 1 to 2 times as great as the radius of the drive wheel around which the elastic crawler is wrapped, the above-mentioned effect of relieving the stress can be obtained.

What is claimed is:

1. An elastic crawler comprising a crawler body (6) made of a rubbery elastic material in a form of an endless belt; and a tension cord (10) being buried in the crawler body (6) along the circumferential direction (A) thereof, the tension cord (10) having opposite ends (10a),(10b) which are joined together by overlapping one upon the other so as to arrange the tension cord (10) as an endless cord having an overlapped joint portion (12), the overlapped joint portion (12) of the tension cord (10) being formed into an arcuate shape protruding on the outer circumferential side of the crawler.

2. The elastic crawler according to claim 1, wherein a portion of the elastic crawler (5) corresponding to the overlapped joint portion (12) of the tension cord (10) is cured and molded in a mold (16) so as to assume an arcuate shape protruding on the outer circumferential side of the crawler.

3. The elastic crawler according to claim 1, wherein the overlapped joint portion (12) of the tension cord (10) has a radius of arc which is 1 to 2 times as large as a radius of a drive wheel (2) round which the elastic crawler (5) is wrapped.

4. The elastic crawler according to claim 2, wherein the overlapped joint portion (12) of the tension cord (10) has a radius of arc which is 1 to 2 times as large as a radius of a drive wheel (2) round which the elastic crawler (5) is wrapped.

5. A method of producing an elastic crawler comprising a crawler body (6) made of a rubbery elastic material in a form of an endless belt; and a tension cord (10) being buried in the crawler body along the circumferential direction thereof and having opposite ends (10a),(10b) which are joined together by overlapping one upon the other so as to arrange the tension cord as an endless cord, the method comprising steps of:

molding a belt-like crawler body (11) having opposite ends; overlapping the ends of the molded crawler body (11) one upon the other; and curing and molding the overlapped portion to produce an endless elastic crawler, wherein         the overlapped portion of the molded crawler body (11) is cured and molded in a mold (16) so as to assume an arcuate shape protruding on the outer circumferential side of the crawler.

6. A method of producing an elastic crawler according to claim 5, wherein the overlapped portion is pre-molded in the overlapping process so as to assume an arcuate shape protruding on the outer circumferential side of the crawler.

7. A method of producing an elastic crawler according to claim 5, wherein the overlapped portion is pre-molded in the overlapping process so as to assume an arcuate shape protruding on the outer circumferential side of the crawler and, then, the pre-molded overlapped portion is cured and molded in a mold (16) so as to assume an arcuate shape protruding on the outer circumferential side of the crawler.

8. A method of producing an elastic crawler according to claim 5, wherein the overlapped portion of the molded crawler body (11) has a radius of arc which is 1 to 2 times as large as a radius of a drive wheel (2) round which the elastic crawler (5) is wrapped.

9. A method of producing an elastic crawler according to claim 6, wherein the overlapped portion of the molded crawler body (11) has a radius of arc which is 1 to 2 times as large as a radius of a drive wheel (2) round which the elastic crawler (5) is wrapped.

10. A method of producing an elastic crawler according to claim 7, wherein the overlapped portion of the molded crawler body (11) has a radius of arc which is 1 to 2 times as large as a radius of a drive wheel (2) round which the elastic crawler (5) is wrapped.

* * * * *